United States Patent
Tsuji

(10) Patent No.: US 8,413,348 B2
(45) Date of Patent: Apr. 9, 2013

(54) DISPLACEMENT MEASURING INSTRUMENT

(75) Inventor: Shozaburo Tsuji, Kawasaki (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 177 days.

(21) Appl. No.: 13/085,762

(22) Filed: Apr. 13, 2011

(65) Prior Publication Data
US 2011/0252659 A1 Oct. 20, 2011

(30) Foreign Application Priority Data
Apr. 16, 2010 (JP) ................................ 2010-094862

(51) Int. Cl.
*G01B 3/18* (2006.01)
(52) U.S. Cl.
USPC .................................. 33/815; 33/813; 33/831
(58) Field of Classification Search .................... 33/815, 33/813, 819, 820, 831
See application file for complete search history.

(56) References Cited

U.S. PATENT DOCUMENTS

| | | | |
|---|---|---|---|
| 4,578,868 A | 4/1986 | Sasaki et al. | |
| 6,463,671 B1 * | 10/2002 | Saeki | 33/815 |
| 6,915,591 B2 * | 7/2005 | Hayashida et al. | 33/815 |
| 7,111,413 B2 * | 9/2006 | Seibold | 33/831 |
| 8,296,966 B2 * | 10/2012 | Hayashida et al. | 33/815 |
| 2004/0118004 A1 * | 6/2004 | Hayashida et al. | 33/815 |
| 2011/0247231 A1 * | 10/2011 | Hayashida et al. | 33/815 |
| 2011/0252659 A1 * | 10/2011 | Tsuji | 33/815 |

FOREIGN PATENT DOCUMENTS

| | | |
|---|---|---|
| EP | 1099928 A1 | 5/2001 |
| JP | 41-17829 | 10/1941 |
| JP | 47-1166 | 8/1972 |
| JP | 56-35761 | 8/1981 |
| JP | 59-112202 | 6/1984 |
| JP | 5-057602 | 7/1993 |
| JP | 2008-514904 | 5/2008 |
| JP | 2010-032365 | 2/2010 |

* cited by examiner

*Primary Examiner* — Yaritza Guadalupe-McCall
(74) *Attorney, Agent, or Firm* — Rankin, Hill & Clark LLP

(57) ABSTRACT

A displacement measuring instrument includes a spindle screwed to a stationary sleeve, a thimble, an operation sleeve, and a constant pressure mechanism. The constant pressure mechanism includes: a rotary driving element rotatable together with the operation sleeve; a rotary driven element coupled to the rotary driving element in such a manner as to be rotatable together with the rotary driving element but not to be rotatable when a predetermined or more load is applied to the spindle; and a rotation transmitting mechanism transmitting a rotation of the rotary driven element to the spindle. A male thread portion with the same pitch as that of a male thread portion of the spindle is formed on the outer circumference of the stationary sleeve. A female thread portion is formed on the inner circumference of the thimble and screwed to the male thread portion of the stationary sleeve.

4 Claims, 3 Drawing Sheets

DISPLACEMENT MEASURING INSTRUMENT

The entire disclosure of Japanese Patent Application No. 2010-094862 filed Apr. 16, 2010 is expressly incorporated by reference herein.

BACKGROUND OF THE INVENTION

1. Field of the Invention

The present invention relates to a displacement measuring instrument for measuring a dimension or the like of an object to be measured based on an axial displacement of a spindle.

2. Description of Related Art

There have been known micrometers for measuring a dimension or the like of an object to be measured based on an axial displacement of a spindle, some of which include a constant pressure mechanism allowing measurement with a substantially constant measurement force against the object (See Patent Literature 1: JP-A-2010-32365).

Specifically, such an arrangement includes: a stationary sleeve fixed to a body; an axially movable spindle screwed to the stationary sleeve; a thimble rotatably mounted on the outer circumference of the stationary sleeve and having an outer end coupled to the outer end of the spindle; an operation sleeve fitted over a range from the outer circumference of the thimble to the outer end of the spindle; and a constant pressure mechanism interposed between the outer end of the operation sleeve and the outer end of the spindle and freely rotated relative to the spindle when a predetermined or more load is applied to the spindle.

In a micrometer having the above arrangement, the operation sleeve is rotated to cause a forward movement of the spindle in measurement. When a distal end of the spindle comes into contact with the object and the predetermined or more load is applied to the spindle, the constant pressure mechanism is actuated to allow a free rotation of the operation sleeve, so that the object can be measured with a constant measurement force.

Some measurers, however, may apply to the operation sleeve a force other than the rotation force, such as a twisting force or a radial force. If so, the force, such as a twisting force or a radial force, applied to the operation sleeve is directly transmitted to the spindle via the thimble, increasing a friction force at a thread (male thread portion) defined in the spindle and hampering a smooth rotation of the spindle. This results in a variation in the measurement force and, consequently, in measurement values.

SUMMARY OF THE INVENTION

An object of the invention is to provide a displacement measuring instrument capable of elimination of factors causing a variation in measurement values and of improvement in repeat accuracy.

According to an aspect of the invention, a displacement measuring instrument includes: a body; a stationary sleeve fixed to the body; an axially movable spindle having a male thread portion screwed to the stationary sleeve; a thimble rotatably fitted onto an outer circumference of the stationary sleeve; and an operation sleeve fitted over a range from an outer circumference of the thimble to an outer end of the spindle and being rotatable relative to the thimble; and a constant pressure mechanism interposed between the operation sleeve and the spindle, the constant pressure mechanism transmitting a rotation of the operation sleeve to the spindle and allowing a free rotation of the operation sleeve relative to the spindle when a predetermined or more load is applied to the spindle, in which the constant pressure mechanism includes: a rotary driving element rotatable together with the operation sleeve; a rotary driven element coupled to the rotary driving element in such a manner as to be rotatable together with the rotary driving element but not to be rotatable when a predetermined or more load is applied to the spindle; and a rotation transmitting mechanism transmitting a rotation of the rotary driven element to the spindle, a male thread portion having the same pitch as a pitch of the male thread portion of the spindle is formed on the outer circumference of the stationary sleeve, and a female thread portion is formed on an inner circumference of the thimble, the female thread portion screwed to the male thread portion of the stationary sleeve.

In the above arrangement, when the operation sleeve is rotated, the rotary driving element of the constant pressure mechanism is also rotated together with the operation sleeve. As long as a load on the spindle is less than the predetermined load, the rotation of the rotary driving element is transmitted to the rotary driven element. When the rotary driven element is rotated, the rotation of the rotary driven element is transmitted not only to the thimble, but also to the spindle via the rotation transmitting mechanism. Since the thimble is screwed to the male thread portion of the stationary sleeve and the spindle (the male thread portion of the spindle) is screwed to the female thread portion of the stationary sleeve, the thimble and the spindle are rotated and axially moved together. When the forward movement of the spindle brings the spindle into contact with an object to be measured, the spindle is subjected to the predetermined or more load. This causes a free rotation of the rotary driving element, i.e., the operation sleeve, relative to the rotary driven element. Thus, the object can be measured with a constant measurement force.

At this time, when a force other than the rotation force such as a twisting force or a radial force is applied to the operation sleeve, this force is transmitted to the thimble. Since the inner circumference of the thimble is provided with the female thread portion screwed to the male thread portion of the stationary sleeve, the force transmitted to the thimble is received by the stationary sleeve. Thus, such a twisting force or a radial force is not applied to the spindle, so that a factor causing a variation in the measurement force and, consequently, in measurement values can be eliminated. As a result, repeat accuracy can be improved.

In the displacement measuring instrument, it is preferable that the rotation transmitting mechanism includes: an elongated hole formed at the outer end of the spindle along an axial direction of the spindle; and a transmission pin fixed to the rotary driven element while engaged with the elongated hole in a movable manner along the axial direction of the spindle.

In the above arrangement, the transmission pin fixed to the rotary driven element is engaged with the elongated hole formed at the outer end of the spindle in a movable manner in the axial direction of the spindle along the elongated hole, so that only the rotation of the rotary driven element can be transmitted to the spindle. Thus, even when a force other than the rotation force such as a twisting force or a radial force is applied to the operation sleeve, only the rotation force can be transmitted to the spindle, ensuring a highly accurate measurement.

In the displacement measuring instrument, it is preferable that the operation sleeve includes: a first operation portion fitted onto the outer circumference of the thimble; a second operation portion connected to an outer end of the first operation portion to cover an outer circumference of the constant pressure mechanism and rotatable together with the rotary driving element of the constant pressure mechanism, and a coupling portion between the first operation portion and the second operation portion is provided with an insertion coupling mechanism insertably coupling the second operation portion to the first operation portion and transmitting a rotation of the second operation portion to the first operation portion when the second operation portion is coupled.

In the above arrangement, in assembly, firstly, the thimble is set on the stationary sleeve at a predetermined position by screwing the female thread portion of the thimble to the male thread portion of the stationary sleeve. Secondly, the first operation portion is fitted onto the outer circumference of the thimble and the constant pressure mechanism is attached to the outer end of the thimble with the rotary driven element coupled to the thimble. Finally, the second operation portion is coupled to the first operation portion by insertion, thereby completing the assembly. The assembly is thus advantageously simplified.

In the displacement measuring instrument, it is preferable that the first operation portion has a diameter smaller than a diameter of the stationary sleeve.

In the above arrangement, the first operation portion is fitted onto the outer circumference of the thimble and the second operation portion having a diameter smaller than that of the outer sleeve is coupled to the outer end of the first operation portion to cover the outer circumference of the constant pressure mechanism. Thus, the instrument can be operated, for instance, either in a two-hand control where one holds the body with the left hand while rotating the second operation portion with the right hand, or in a one-hand control where one holds the body with one hand while rotating the first operation portion with the same hand. In either control, it is possible to ensure operation and operability equivalent to those of typical instruments.

DETAILED DESCRIPTION OF PREFERRED EMBODIMENT(S)

An exemplary embodiment of the invention will be described below with reference to drawings. In this exemplary embodiment, description will be made on a digital micrometer as an example of a displacement measuring instrument.

Structure of Digital Micrometer

Figure 1:
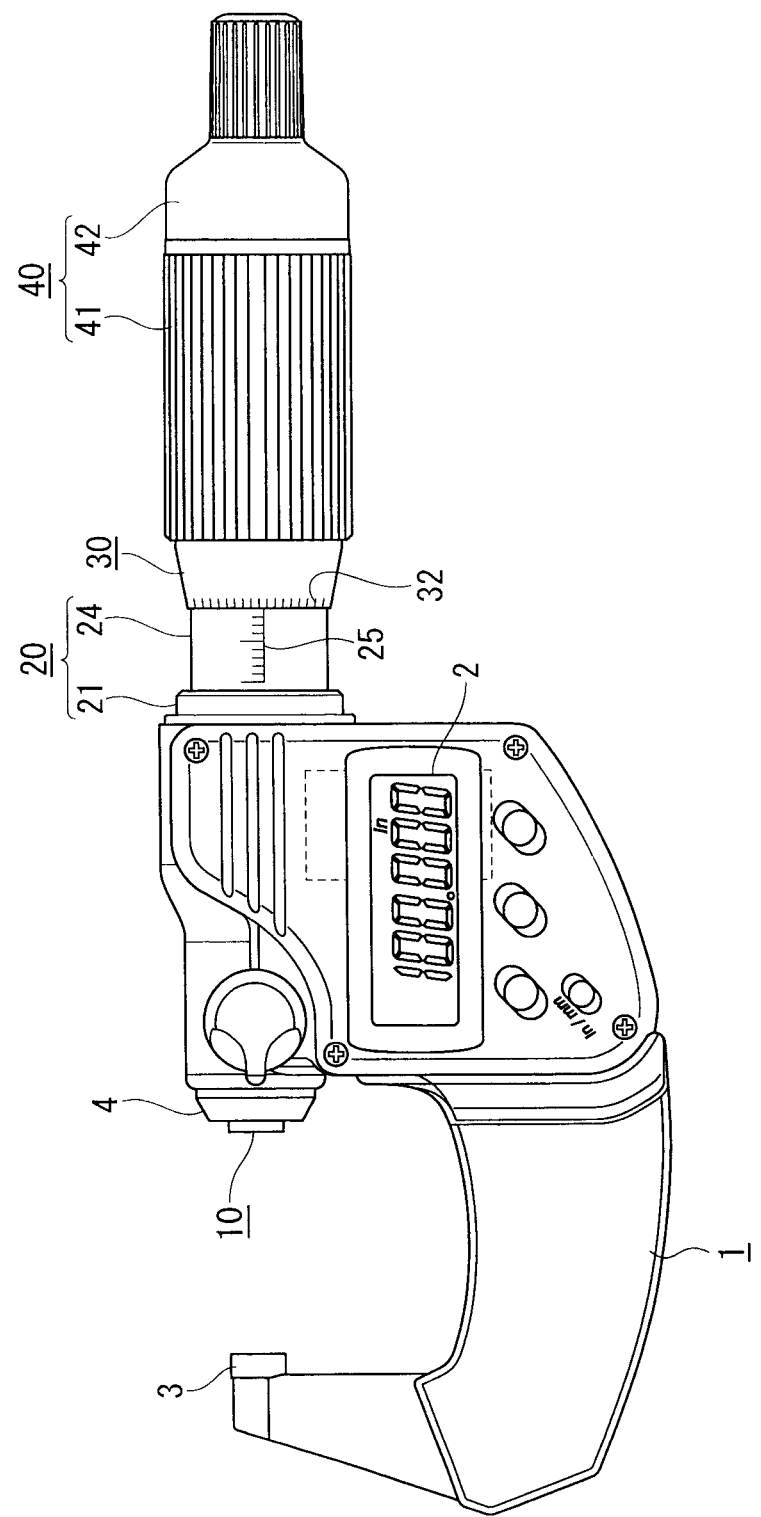
FIG. 1 is a front elevation showing a digital micrometer according to an exemplary embodiment of the invention.

As shown in FIG. 1, a digital micrometer includes: a substantially U-shaped body 1; a spindle 10 slidably attached to the body 1; an encoder (not shown) that detects a displacement of the spindle 10 inside the body 1; and a digital display 2 that displays the displacement (measurement value) of the spindle 10 detected by the encoder.

An anvil 3 is rigidly mounted on an end of the body 1 and a sleeve 4 for slidably supporting the spindle 10 is attached to the other end of the body 1.

The spindle 10 has an inner side inserted through the sleeve 4 to be supported thereby and an outer side supported relative to the body 1 via a stationary sleeve 20 in a rotatable manner as well as in an axially movable manner.

Figure 2:
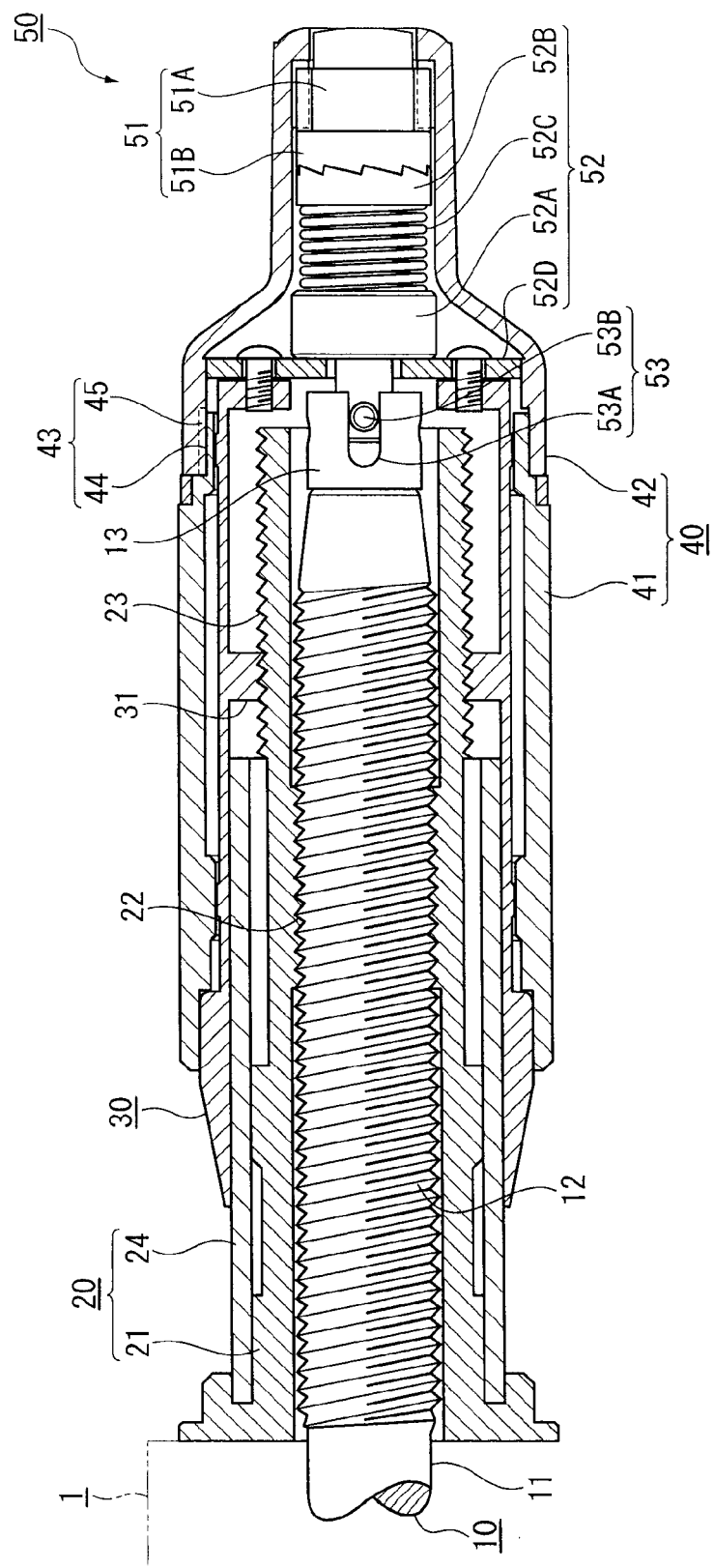
FIG. 2 is a partial cross section of the above exemplary embodiment.
Figure 3:
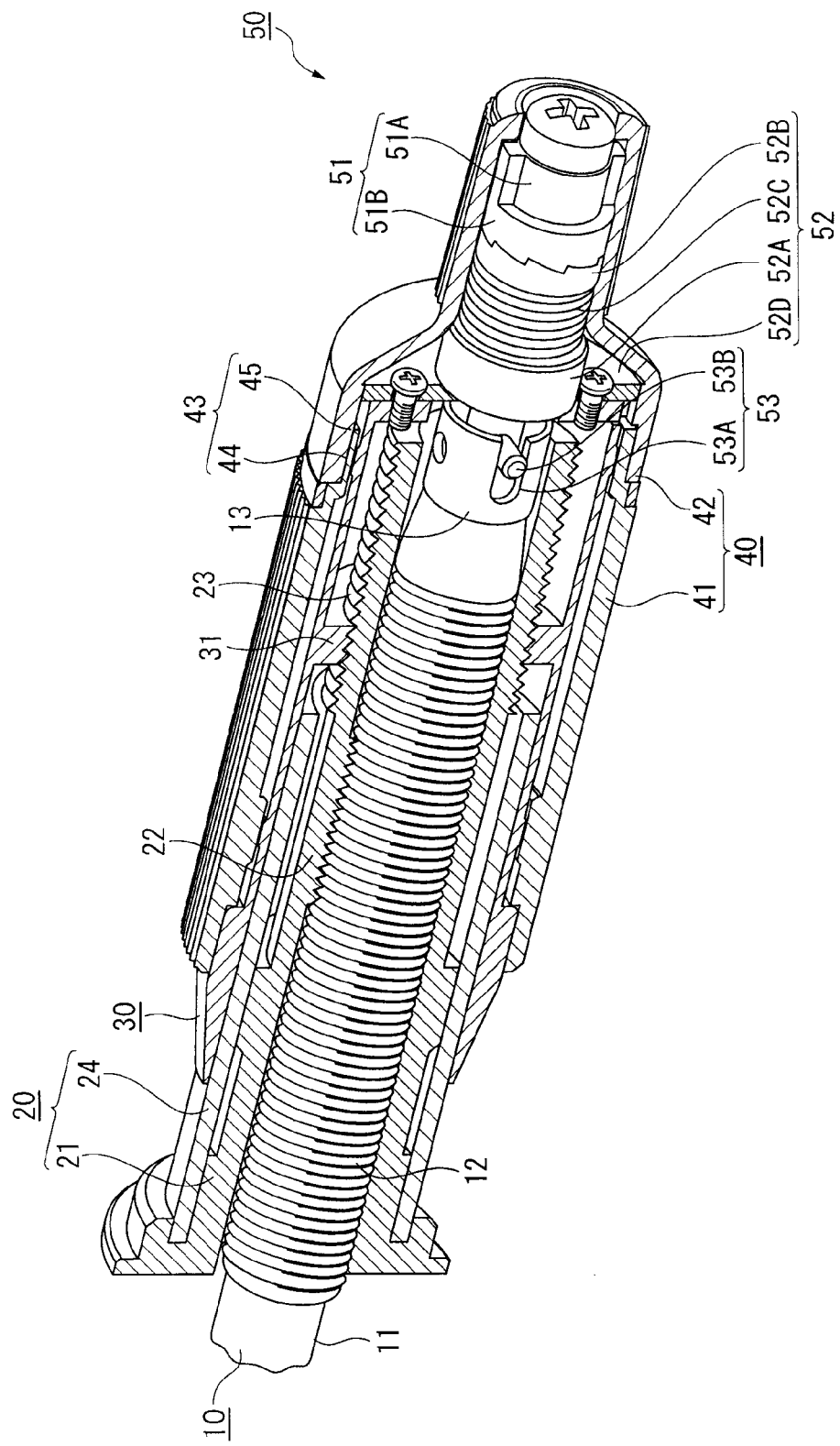
FIG. 3 is a perspective view of the portion shown in FIG. 2.

As shown in FIGS. 2 and 3, the spindle 10 includes: a round-rod shaped shaft 11 formed in the inner side of the spindle 10; a male thread portion 12 integrally formed with the outer end of the shaft 11; and a joint 13 integrally formed with the outer end of the male thread portion 12. These elements may be formed of a single cylindrical member or, alternatively, may be independently formed of different members.

The stationary sleeve 20 includes: a cylindrical inner sleeve 21 having an inner end fixed to the body 1 to cover the outer circumference of the male thread portion 12 of the spindle 10; and a cylindrical outer sleeve 24 fixed to the outer circumference of the inner sleeve 21.

The inner sleeve 21 has a female thread portion 22 formed at an intermediate position of the inner circumference of the inner sleeve 21 over a predetermined distance and screwed to the male thread portion 12 of the spindle 10, and a male thread portion 23 formed at the outer end of the outer circumference of the inner sleeve 21. The module of the female thread portion 22 and the male thread portion 23 is the same as that of the male thread portion 12 of the spindle 10. In other words, the female thread portion 22 and the male thread portion 23 have screw threads whose shape and pitch are the same as those of the male thread portion 12 of the spindle 10.

The outer sleeve 24 has a length sufficient to cover the inner sleeve 21 from the inner end of the inner sleeve 21 to a position just before the male thread portion 23. The outer sleeve 24 is provided with a main scale 25 with 1.0 mm pitch formed along an axial direction on the outer circumference (see FIG. 1).

A cylindrical thimble 30 is rotatably fitted onto the outer circumference of the outer sleeve 24. Likewise, a cylindrical operation sleeve 40 is rotatably fitted onto the outer circumference of the thimble 30.

A constant pressure mechanism 50 is interposed between the outer end of the operation sleeve 40 and the outer end of the spindle 10. The constant pressure mechanism 50 not only transmits the rotation of the operation sleeve 40 to the spindle 10 and the thimble 30 but also allows a free rotation of the operation sleeve 40 relative to the spindle 10 and the thimble 30 when the spindle 10 is subjected to a predetermined or more load.

The thimble 30 has a female thread portion 31 formed at an intermediate position of the inner circumference of the thimble 30 and screwed to the male thread portion 23 of the inner sleeve 21, and a vernier scale 32 with a predetermined pitch formed at the inner end of the outer circumference of the thimble 30 (see FIG. 1). The vernier scale 32 is formed at intervals where the outer circumference of the thimble 30 is divided into, for instance, 100 equal parts.

The operation sleeve 40 includes: a first operation portion 41 rotatably fitted onto the outer circumference of the thimble 30; and a second operation portion 42 coupled to the outer end of the first operation portion 41 to cover the outer circumference of the constant pressure mechanism 50.

The first operation portion 41 has a diameter larger than the outer diameter of the thimble 30. The second operation portion 42 has a diameter smaller than the outer diameter of the stationary sleeve 20.

A coupling portion between the first operation portion 41 and the second operation portion 42 is provided with an insertion coupling mechanism 43. The insertion coupling mechanism 43 insertably couples the second operation portion 42 to the first operation portion 41 and transmits the rotation of the second operation portion 42 to the first operation portion 41 when the second operation portion 42 is coupled. The insertion coupling mechanism 43 includes: a groove 44 formed on the outer circumference of the outer end of the first operation portion 41; and a protrusion 45 formed on the inner circumference of the inner end of the second operation portion 42 to be inserted into the groove 44 for engagement.

The constant pressure mechanism 50 includes: a rotary driving element 51 rotated together with the second operation portion 42 of the operation sleeve 40; a rotary driven element 52 coupled to the thimble 30 while coupled to the rotary driving element 51 in such a manner as to be rotatable together with the rotary driving element 51, but not to be rotatable when the spindle 10 is subjected to a predetermined or more load; and a rotation transmitting mechanism 53 interposed between the rotary driven element 52 and the outer end of the spindle 10 to transmit the rotation of the rotary driven element 52 to the spindle 10.

The rotary driving element 51 includes: an engaging portion 51A housed in the second operation portion 42 of the operation sleeve 40 and engaged with the second operation portion 42; and a first ratchet wheel 51B having a saw-tooth gear integrally formed with the inner end surface of the engaging portion 51A and arranged along the outer circumference of the inner end surface.

The rotary driven element 52 includes: a base 52A; a second ratchet wheel 52B having a saw-tooth gear provided near the outer end surface of the base 52A in an axially displaceable manner to be engageable with the first ratchet wheel 51B of the rotary driving element 51; a coil spring 52C biasing the second ratchet wheel 52B against the first ratchet wheel 51B; and a connecting plate 52D connecting the base 52A and the outer end of the thimble 30.

The rotation transmitting mechanism 53 includes: an elongated hole 53A formed in the joint 13 of the spindle 10 along an axial direction of the spindle 10; and a transmission pin 53B fixed to the rotary driven element 52 while engaged with the elongated hole 53A in a movable manner along the axial direction of the spindle 10.

Assembly of Digital Micrometer

In assembly, the thimble 30 is initially set on the outer circumference of the outer sleeve 24 at a predetermined position by screwing the female thread portion 31 of the thimble 30 to the male thread portion 23 of the inner sleeve 21.

Subsequently, the first operation portion 41 is fitted onto the outer circumference of the thimble 30, and the connecting plate 52D of the constant pressure mechanism 50 is fixed to the outer end of the thimble 30 using a screw or the like to couple the rotary driven element 52 to the thimble 30. In this state, since the connecting plate 52D also serves as a lid for the first operation portion 41, i.e., a lid for preventing accidental detachment of the first operation portion 41, the first operation portion 41 is set with its movement in the axial direction of the spindle 10 being restricted. Subsequently, the second operation portion 42 and the first operation portion 41 are coupled together by inserting the second operation portion 42 into the first operation portion 41. The assembly can be completed in such a simple manner. How to Use Digital Micrometer When the operation sleeve 40 is rotated, the rotary driving element 51 of the constant pressure mechanism 50 is rotated together with the operation sleeve 40. Since the first ratchet wheel 51B of the rotary driving element 51 is engaged with the second ratchet wheel 52B of the rotary driven element 52, the rotary driven element 52 (the second ratchet wheel 52B) is also rotated. The rotation of the rotary driven element 52 is transmitted not only to the thimble 30 via the connecting plate 52D but also to the spindle 10 via the rotation transmitting mechanism 53. Since the thimble 30 is screwed to the male thread portion 23 of the inner sleeve 21 while the spindle 10 (the male thread portion 12 of the spindle 10) is screwed to the female thread portion 22 of the inner sleeve 21, the thimble 30 and the spindle 10 are rotated to be axially moved together.

When the forward movement of the spindle 10 brings the spindle into contact with an object to be measured, the spindle 10 is subjected to the predetermined or more load. Thus, the rotary driving element 51 is freely rotated relative to the rotary driven element 52 of the constant pressure mechanism 50. Specifically, in a state where the spindle 10 is subjected to the predetermined or more load, when one tries to further rotate the operation sleeve 40 to rotate the rotary driving element 51 (the first ratchet wheel 51B), the rotary driven element 52 (the second ratchet wheel 52B), which is prevented from easy rotation, moves away toward the coil spring 52C against the coil spring 52C, so that the rotation force of the first ratchet wheel 51B is not transmitted to the second ratchet wheel 52B, thereby allowing a free rotation of the operation sleeve 40 and, consequently, maintaining a constant pressure state.

In this manner, the object can be measured with a constant measurement force. The rotation of the spindle 10 detected by the encoder is converted into a displacement in the axial direction of the spindle 10 and displayed on the digital display 2, so that the dimension of the object can be measured by reading the displayed value on the digital display 2.

At this time, when a force other than the rotation force, such as a twisting force or a radial force, is applied to the operation sleeve 40, this force is transmitted to the thimble 30. Since the inner circumference of the thimble 30 is provided with the female thread portion 31 screwed to the male thread portion 23 of the inner sleeve 21, the force transmitted to the thimble 30 is received by the inner sleeve 21. Thus, such a twisting force or a radial force is not applied to the spindle 10, so that a factor causing a variation in the measurement force and, consequently, in measurement values can be eliminated. As a result, repeat accuracy can be improved.

In the rotation transmitting mechanism 53, the transmission pin 53B fixed to the rotary driven element 52 is engaged with the elongated hole 53A, which is formed at the outer end of the spindle 10, in a movable manner in the axial direction of the spindle 10 along the elongated hole 53A. In this arrangement, only the rotation of the rotary driven element 52 can be transmitted to the spindle 10. Thus, even when a force other than the rotation force, such as a twisting force or a radial force, is applied to the operation sleeve 40, only the rotation force can be transmitted to the spindle 10, ensuring a highly accurate measurement.

The first operation portion 41 is fitted onto the outer circumference of the thimble 30 while the second operation portion 42 having a diameter smaller than that of the outer sleeve 24 is coupled to the outer end of the first operation portion 41 to cover the outer circumference of the constant pressure mechanism 50. In this arrangement, the instrument can be operated, for instance, either in a two-hand control where one holds the body 1 with the left hand while rotating the second operation portion 42 with the right hand, or in a one-hand control where one holds the body 1 with one hand while rotating the first operation portion 41 with the same hand. In either control, it is possible to ensure operation and operability equivalent to those of typical instruments.

Modifications

The scope of the invention is not limited to the above exemplary embodiment, but includes modifications and improvements as long as an object of the invention can be achieved.

Although the stationary sleeve 20 includes two members such as the inner sleeve 21 and the outer sleeve 24 in the above exemplary embodiment, these members may be integrally formed with each other.

Although a digital displacement measuring instrument is exemplified by a digital micrometer in the above exemplary embodiment, the invention can be applied to any other measuring instrument. For instance, the invention may be applied to a digital micrometer head or the like.

What is claimed is:

1. A displacement measuring instrument comprising:
   a body;
   a stationary sleeve fixed to the body;
   an axially movable spindle having a male thread portion screwed to the stationary sleeve;
   a thimble rotatably fitted onto an outer circumference of the stationary sleeve;
   an operation sleeve fitted over a range from an outer circumference of the thimble to an outer end of the spindle and being rotatable relative to the thimble; and
   a constant pressure mechanism interposed between the operation sleeve and the spindle, the constant pressure mechanism transmitting a rotation of the operation sleeve to the spindle and allowing a free rotation of the operation sleeve relative to the spindle when a predetermined or more load is applied to the spindle, wherein
   the constant pressure mechanism comprises:
   a rotary driving element rotatable together with the operation sleeve;
   a rotary driven element coupled to the thimble while coupled to the rotary driving element in such a manner as to be rotatable together with the rotary driving element but not to be rotatable when a predetermined or more load is applied to the spindle; and
   a rotation transmitting mechanism transmitting a rotation of the rotary driven element to the spindle,
   a male thread portion having the same pitch as a pitch of the male thread portion of the spindle is formed on the outer circumference of the stationary sleeve, and
   a female thread portion is formed on an inner circumference of the thimble, the female thread portion screwed to the male thread portion of the stationary sleeve.

2. The displacement measuring instrument according to claim 1, wherein
   the rotation transmitting mechanism comprises:
   an elongated hole formed at the outer end of the spindle along an axial direction of the spindle; and a transmission pin fixed to the rotary driven element while engaged with the elongated hole in a movable manner along the axial direction of the spindle.

3. The displacement measuring instrument according to claim 1, wherein
   the operation sleeve comprises:
   a first operation portion fitted onto the outer circumference of the thimble;
   a second operation portion connected to an outer end of the first operation portion to cover an outer circumference of the constant pressure mechanism and rotatable together with the rotary driving element of the constant pressure mechanism, and
   a coupling portion between the first operation portion and the second operation portion is provided with an insertion coupling mechanism insertably coupling the second operation portion to the first operation portion and transmitting a rotation of the second operation portion to the first operation portion when the second operation portion is coupled.

4. The displacement measuring instrument according to claim 1, wherein
   the second operation portion has a diameter smaller than a diameter of the stationary sleeve.

* * * * *